United States Patent [19]

Lewis et al.

[11] 4,354,894

[45] Oct. 19, 1982

[54] APPARATUS FOR DEPOSITING A COUPON ON A PACKAGE

[75] Inventors: Robert T. Lewis, Louisville; John H. Sexstone, Anchorage, both of Ky.

[73] Assignee: Brown & Williamson Tobacco Corporation, Louisville, Ky.

[21] Appl. No.: 289,931

[22] Filed: Aug. 4, 1981

[51] Int. Cl.$^{3}$ .............................................. B32B 31/00

[52] U.S. Cl. .................................... 156/517; 156/521; 156/566; 271/245; 271/275

[58] Field of Search ............... 156/516, 517, 519, 521, 156/522, 566; 271/245-246, 274-275

[56] References Cited

U.S. PATENT DOCUMENTS 2,805,857 9/1957 Policansky .......................... 271/275
3,649,414 3/1972 Brenner .............................. 156/521
3,761,075 9/1973 Namen ................................ 271/274
4,020,972 5/1977 Lundblad ........................ 271/245 X
4,094,724 6/1978 Sato ................................ 156/517 X

*Primary Examiner*—David A. Simmons
*Attorney, Agent, or Firm*—Charles G. Lamb

[57] ABSTRACT

An apparatus for placing a coupon, or the like, on a package as the package moves through the apparatus. The apparatus includes a supply source of coupons in the form of a web of coupons, a coupon web advance drum for pulling the coupon web from the supply source, a scissors device for cutting the coupon web into individual coupons, and a coupon conveyor device for moving individual coupons from the scissors device to the package and depositing the coupon on the package as it continuously moves past.

10 Claims, 3 Drawing Figures

APPARATUS FOR DEPOSITING A COUPON ON A PACKAGE

BACKGROUND OF THE INVENTION

The present invention relates to packaging devices, and more particularly to an apparatus for depositing coupons, and the like, on a continuously moving package.

The terms coupon and package used herein are to be understood in their generic sense. That is, a coupon could be, for example, a certificate, stamp, label or the like, and a package could be, for example, a box, container, bundle, carton or the like.

Coupons are used on packages in many industries. They are used, for example, to identify the contents of a package, the condition of the contents of a package, and instructions for use of the contents of a package. In the cigarette industry, coupons which are redeemable for merchandise are used on cigarette packages.

In high volume production processes, such as the process for packaging cigarettes, the packages must continuously move at a high rate of speed and the coupons must be accurately placed on the moving packages. Therefore, the placing of a coupon on a package can be a bottleneck slowing the manufacturing process and, thereby, increase the cost of the product.

SUMMARY OF THE INVENTION

The present invention recognizes these problems in a high volume production process, and provides an apparatus for depositing a coupon on a continuously moving package while accurately orienting the coupon on the moving package. Furthermore, the present invention provides such an apparatus which performs these tasks automatically without human intervention.

More particularly, the present invention provides an apparatus for depositing a coupon onto a moving package comprising:

a supply source of a web of coupons;

a rotatably mounted and driven web advance drum adapted to engage said supply web of coupons in overlaying relationship around at least a portion of its periphery for pulling the coupon web from its source;

coupon web hold down means adjacent the portion of the periphery of the advance drum over which the coupon web is overlaid for assuring that the coupon web does not separate from its overlaying relationship on the periphery of the advance drum;

coupon web stripper means located near the periphery of the web advance drum for stripping the coupon web from the periphery of the web advance drum;

web cutting means located adjacent the stripper means for cutting the coupon web into individual coupons;

conveyor means for moving individual coupons, one at a time, from the web cutting means;

coupon alignment means operatively associated with the conveyor means for interrupting the movement of a coupon with the conveyor means and aligning the coupon with the path of the package upon which it is to be deposited; and, coupon discharge means for transporting individual coupons, one at a time, from the alignment means and depositing the coupon onto the package moving thereby.

DESCRIPTION OF THE DRAWINGS

A better understanding of the present invention can be had upon reference to the accompanying specification and by reference to the following drawings in which.

DETAILED DESCRIPTION OF THE PREFERRED EMBODIMENT

Figure 1:
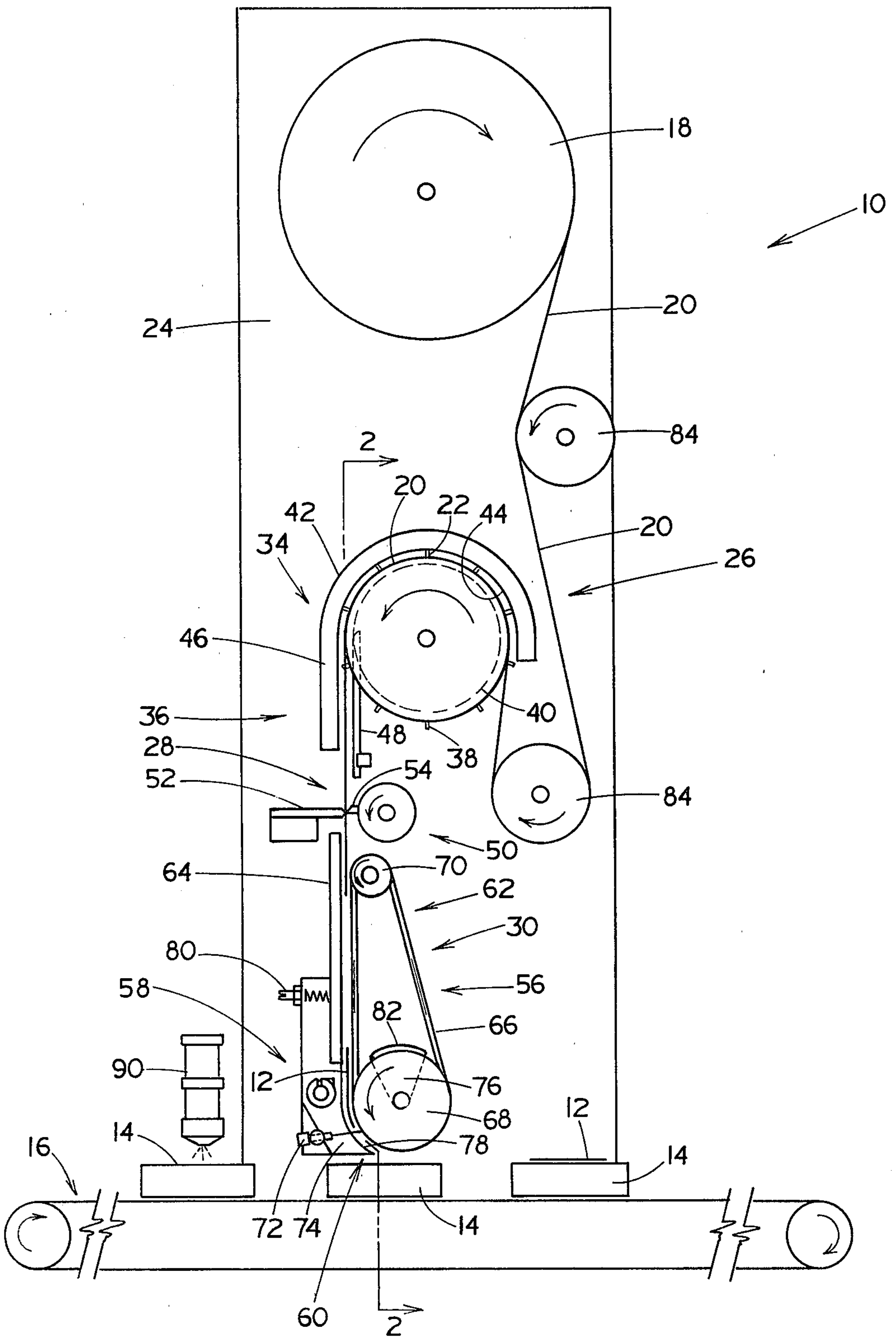
FIG. 1 is a diagrammatic side view of an advantageous embodiment of the present invention.
Figure 2:
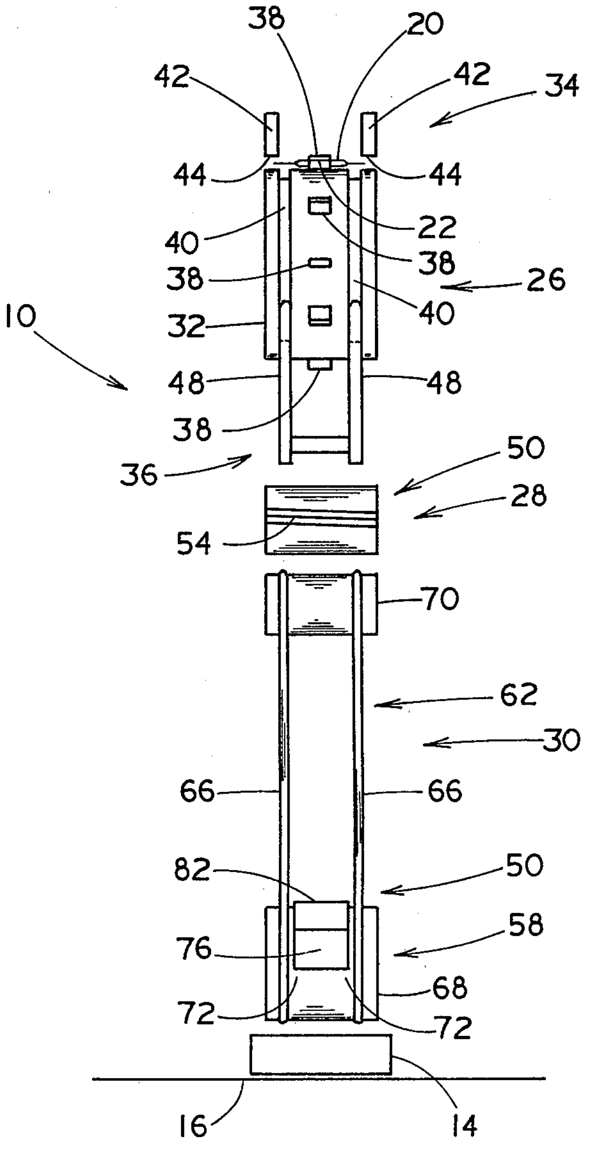
FIG. 2 is a diagrammatic end view taken in the direction of arrows 2—2 in FIG. 1; and, FIG. 3 is a plan view of a section of a web of coupons used with the present invention.

The figures illustrate an apparatus, generally denoted as the numeral 10, for depositing coupons 12, or the like, onto the surface of packages 14 as the packages continuously move past the apparatus 10. In the illustration of FIGS. 1 and 2, individual packages 14 are moved on a conveyor device 16 beneath and past the apparatus 10.

Figure 3:
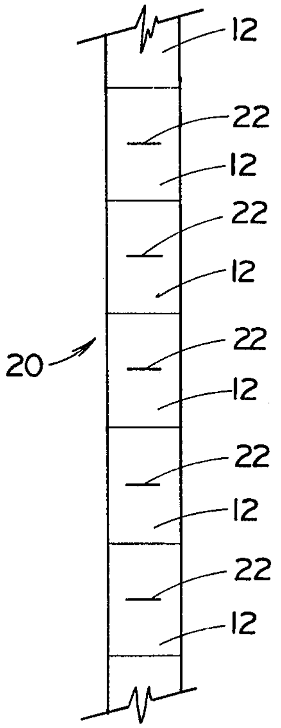

The coupons 12 to be deposited on the moving packages 14 are supplied from a supply roll 18 formed of a coupon web 20 composed of a series of coupons. The web 20 can be, for example, a continuous length of paper having coupons printed thereon. As shown in FIG. 3, the web 20 is formed with a plurality of spaced apart, parallel slits 22 oriented transversely of and centered with respect to the longitudinal centerline of the web 20. As shown, each slit 22 is formed through a different one of the printed coupons as opposed, for example, to being formed at the margins of the coupons.

The apparatus 10 has an appropriate frame, generally denoted as the numeral 24, to which its various components are mounted. The frame is not particularized because it is incidental to the present invention.

For the sake of organization of the following discussion, the apparatus 10 can be considered to have a coupon web advance station, generally denoted as the numeral 26, for unwinding the coupon web 20 from the supply roll 18, a coupon severing station, generally denoted as the numeral 28, for cutting the coupon web 20 into individual coupons 12, and a coupon feed station, generally denoted as the numeral 30, for transferring individual coupons 12 from the severing station 28 to the package 14 passing beneath it on the package conveyor device 16.

As can be best seen in FIG. 1, the coupon web advance station 26 is located below the coupon web supply roll 18 and comprises a driven, rotatably mounted coupon web advance drum 32 which is adapted to engage the coupon web 20 in overlaying relationship about at least a portion of its periphery to unwind the coupon web from the supply roll, web hold down means 34 located in close proximity to the periphery of the web advance drum 32 over which the coupon web 20 is overlaid to assure that the coupon web 20 does not separate from its overlaying relationship on the periphery of the advance drum 32, and a coupon web stripper means 36 at the periphery of the web advance drum 32 for stripping the coupon web 20 from the periphery of the drum 32.

The web advance drum is rotatably mounted and driven for continuous rotation while the apparatus 10 is in operation. The advance drum 32 has a peripheral surface substantially the same width as the coupon web 20. A plurality of web engagement cleats 38 are equally spaced about the periphery of the advance drum 32 and project radially outwardly from the periphery. The web engagement cleats 38 are smaller in width than the length of the slits 22 in the coupon web 20 and are centered on the peripheral surface of the drum, but do not extend across the full width of the peripheral surface of the advance drum 32. These web engagement cleats 38 are each received through a different one of the slits 22 in the coupon web 20 so that as the advance drum rotates, the cleats 38 coact with the slits 22 and pull the coupon web 20 from the supply roll 18. As can be best seen in FIG. 2, the web advance drum 32 is also formed with two circumferential grooves 40 in its peripheral surface on either side of the cleats 38 for a reason hereinafter explained.

The coupon web hold down means 34 is illustrated as comprising two web hold down plates 42 each located next to a different one of the circumferential grooves 40. Each hold down plate 42 has a concave arcuate surface 44 of substantially the same radius as the advance drum 32 and a leg 46 extending tangentially to the arcuate surface 44. The hold down plates 42 are each located coaxially with the advance drum 32 with the arcuate surface circumscribing about 180° of the advance drum periphery and the tangential leg 46 extending downwardly generally tangential to the peripheral surface of the drum 32. The arcuate surface 44 of each plate 42 is spaced from the peripheral surface of the advance drum 32 by an amount only slightly larger than the thickness of the coupon web 20. The coupon web 20 overlays the peripheral surface of the advance drum 32 covered by the arcuate surfaces 44 of the hold down plates 42 with the longitudinal edges of the coupon web 20 in the space between the peripheral surface of the drum and the arcuate surfaces 44 of the hold down plates 42.

The coupon web stripper means 36 is shown as comprising two spaced apart stationary fingers 48 each of which projects upwardly from a fixed mounted end into a different one of the circumferential grooves 40 in the advance drum 32. Each stationary stripper finger 48 is generally tangential to the peripheral surface of the advance drum 32, and is in spaced apart parallel relationship to a different one the tangentially extending legs 46 of the hold down plates 42. The space between each stripper finger 48 and the tangentially extending leg 46 parallel thereto is only slightly larger than the thickness of the coupon web 20. As the portion of the coupon web 20 overlaying the peripheral surface of the advance drum 32 reaches the stripper means 34, the free ends of the stripper fingers 48 in the circumferential grooves 40 lift the coupon web from the peripheral surface of the advance drum 32 and strips the coupon web 20 off the engagement cleats 38. The coupon web 20 moves from the peripheral surface of the advance drum 32 with its longitudinal edges in the spaces between the stripper fingers 48 and the tangential legs 46 of the hold down plates 42 toward the coupon severing station 28.

The coupon severing station 28 is located near the ends of the tangentially extending legs 46 below the advance drum 32. The coupon severing station 28 comprises coupon cutting means such as, for example, a scissors device 50 for cutting the coupon web 20 into individual coupons 12. The scissors device 50 comprises a stationary blade 52 and a rotatably mounted blade 54. The rotating blade 54 rotates in timed sequence with the rotation of the web advance drum 32 such that the rotatable blade 54 passes the stationary blade 52 in a scissors-like relationship each time the web advance drum 32 rotates a distance corresponding to the space between adjacent web engagement cleats 38. The coupon web 20 leaving the web advance drum 32 moves through the space between the stripper fingers 28 and tangentially extending legs 46, and passes between the stationary blade 52 and rotating blade 54 which cooperate once every revolution of the rotating blade in a scissors-like action to cut individual coupons from the coupon web 20.

The coupon feed station 30 comprises a coupon conveyor means 56 for moving individual coupons 12, one at a time, from the scissors device 50, a coupon alignment means 58 operatively associated with the conveyor means 56 for properly orienting the coupon 12 relative to the path of travel of the package upon which it is to be deposited, and coupon discharge means 60 for transporting individual coupons, one at a time, from the coupon alignment means 58 and onto a package 14 moving beneath it.

The coupons conveyor means 56 is best seen in FIG. 1 as comprising a vertically oriented endless belt-type conveyor 62 and a superimposed vertically disposed coupon slide plate 64 extending downwardly from the stationary blade 52 of the scissors device 50. The endless belt-type conveyor 62 has two spaced apart, parallel O-ring belts 66 trained about a lower driven head pulley 68 and an upper tail pulley 70. The endless belt-type conveyor 62 is located with one flight of its O-ring belts 66 closely adjacent the coupon slide plate 64. The tail pulley 70 is located closely adjacent the stationary blade 52 of the scissors device 50 so that the space separating the belt flights at the coupon slide plate 64 from the stationary blade 52 of the scissors device 50 is less than the length of a coupon 12. Further, the distance between the O-ring belts 66 is less than the width of a coupon 12. The belt-type coupon conveyor 62 continuously moves at a greater linear velocity than the linear velocity of the coupon web 20. As the coupon web 20 moves between the stationary blade 52 and the rotating blade 54 of the scissors device 50, before it is cut into individual coupons, it enters the interface of the coupon slide plate 64 and the flights of the O-ring belts 66 of the belt-type conveyor 62. The two O-ring belts 66 contact the opposite longitudinal sides of the coupon disposed between them and the slide plate 64, and as the coupon is cut from the coupon web by the scissors device 50, the severed coupon is rapidly moved away from the scissors device 50 by the endless belt-type conveyor 62 downwardly toward the coupon alignment means 58.

The coupon alignment means 58 is best seen in FIG. 1, and is located at the head pulley 68 near the lower end of the endless belt-type conveyor 62. The coupon alignment means 58 is illustrated as comprising two parallel spaced apart spring-like wires 72 each attached at one of its ends to the apparatus frame 24 and extending horizontally in a cantilever fashion substantially perpendicular to the flights of the O-ring belts adjacent the slide plate 64. Each cantilever wire 72 passes closely adjacent a different one of the O-ring belts 66 where they wrap around the head pulley of the belt-type conveyor 62. When a coupon 12 moving with the belt-type conveyor 62 reaches the coupon alignment means 58, the free ends of the spring wires 72 temporarily interfere with the further movement of the coupon. Thus, as the O-ring belts 66 continue to move, they force the leading edge of the coupon against the spring wires 72 and thereby cause the coupon to square itself with the spring wires 72. Therefore, the coupon is properly aligned with the path of the coupon upon which the coupon is to be deposited.

However, in order to make sure the coupon is properly aligned, it is preferred to provide an adhering substance on the package so that upon contact between the coupon and the package and subsequent movement of the package prior to wrapping, the coupon stays in place. One preferred means is a commercially available spray assembly 90 disposed upstream of the coupon alignment means 58 to add a drop of adhering material onto the package 14 as it passes underneath. The adhering material may be an adhesive or water; and, just enough to prevent movement of the coupon once it is aligned. Means for activating the spray assembly 90 may be any known means, such as a trip mechanism activated by the package, a cam device, an electronic eye, or the like.

The coupon discharge means 60 is illustrated as comprising two pivotally mounted coupon release plates 74 located at the spring wires 72 of the coupon alignment means 58, and an arcuate coupon engagement shoe 76 on the head pulley 68 of the belt-type conveyor 62 for movement therewith. The coupon release plates 74 each have a concave arcuate surface 78 substantially of the same radius as the head plulley 68 of the belt-type conveyor 62. Each release plate 74 is located adjacent a different one of the O-ring belts of the belt-type conveyor 62 with its arcuate surface 78 in overlaying relationship to the portion of the adjacent O-ring belt wrapped around the head pulley 68. Each of the coupon release plates 74 are biased to pivot toward the head pulley 68 by means of, for example, a compression spring 80. The coupon engagement shoe 76 has a convex arcuate friction face 82 of substantially the same radius as the concave arcuate surface 78 of the coupon release plates 74, and extends around a segment of the head pulley 68. The width of the coupon engagement shoe 76 is approximately equal to the distance between the O-ring belts 66 and it is located between the O-ring belts. As the head pulley 68 of the belt-type conveyor rotates, once every revolution the convex arcuate face of the engagement shoe 76 comes into registration with the concave arcuate surface 78 of the coupon release plates 74 and into contact with the coupon held stationary by the spring wires 72 of the alignment means 58 pushing the coupon release plates 74 away from the head pulley 68 against the bias of the compression springs 80. As the head pulley 68 continues to rotate, the coupon engagement shoe 76 moves the coupon past the spring wires 72 which resiliently bend out of the way to release the coupon, and deposits the coupon on the package 14 as the package moves past immediately below the head pulley 68. After the coupon is removed from the coupon alignment means 58, the spring wires 72 resiliently move back to their position perpendicular to the flight of O-ring belts 66 in preparation for interrupting the movement of and aligning the next coupon.

As can be seen in FIG. 1, an appropriate number of free wheeling coupon web tensioning rollers 84 can be used between the coupon web advance drum 32 and coupon web supply roll 18 to maintain a tension on the coupon web 20 as it is unwound from the supply roll 18 by the advance drum 32.

The drive system for the web advance drum 32, rotating blade 54 and endless belt-type conveyor 62 can be virtually any conventional or otherwise convenient system such as, for example, sheaves and power transmitting belt system, or a geared system.

The foregoing detailed description is given primarily for clarity of understanding and no unnecessary limitations should be understood therefrom for modifications will be obvious to those skilled in the art upon reading this disclosure and may be made without departing from the spirit of the invention or the scope of the appended claims.

What is claimed is:

1. An apparatus for depositing a coupon onto a package as the package moves past the apparatus, comprising:

a supply web of a plurality of coupons;

a rotatably mounted and driven coupon advance drum adapted to engage said supply web of coupons in overlaying relationship around at least a portion of its periphery for advancing said coupon web as the advance drum rotates;

web hold down means adjacent the periphery of said advance drum over which said coupon web is overlaid for assuring said coupon web does not separate from its overlaying relationship on the periphery of said advance drum;

coupon web stripper means for stripping said coupon web from the periphery of said advance drum;

web cutting means located next to said stripper means for cutting said coupon web into individual coupons;

conveyor means for moving individual coupons, one at a time, from said web cutting means;

coupon alignment means operatively cooperating with said conveyor means for interrupting the movement of a coupon with said conveyor means and aligning the coupon web with the path of the package upon which it is to be deposited; and, coupon discharge means for transporting individual coupons, one at a time, from said alignment means and depositing the coupon onto the package moving past it, said coupon discharge means comprising a coupon release plate adjacent said conveyor means mounted for movement toward and away from said conveyor means, and a coupon engagement shoe operatively associated with said conveyor means for movement therewith and adapted to periodically register with said coupon release plate whereupon said coupon engagement shoe moves said release plate away from said conveyor means and contacts a coupon at said coupon alignment means moving the coupon past said coupon alignment means and depositing the coupon onto the moving package.

2. The apparatus of claim 1, wherein:

the web of coupons is formed with spaced apart, parallel slits transverse to and centered on the longitudinal centerline of said web; and, said coupon web advance drum includes a plurality of cleats projecting radially outwardly from the periphery of said advance drum, and spaced apart from each other by the same distance separating adjacent slits in said coupon web.

3. The apparatus of claim 1, wherein said web hold down means comprises:

means defining concave arcuate surfaces overlaying and spaced from the peripheral surface of said advance drum to either side of said cleats, said arcuate surfaces being spaced from the peripheral surface of said advance drum by a distance only slightly greater than the thickness of said coupon web.

4. The apparatus of claim 1, wherein:
said web advance drum is formed with at least one circumferential groove in its peripheral face;
said web hold down means includes at least one leg extending tangentially from said concave arcuate surface defined therein; and,
said coupon web stripper means includes a finger disposed in parallel spaced relationship to said at least one leg, and projecting in to said at least one circumferential groove for stripping said coupon web from the peripheral surface of said advance drum and guiding said web, in the space between said finger and leg, away from said web advance drum.

5. The apparatus of claim 1, wherein said web cutting means comprise a stationary blade and a movable blade which cooperate in a scissors-like manner to cut individual coupons from said coupon web as said coupon web passes therebetween from said web stripper means.

6. The apparatus of claim 1, wherein said coupon conveyor means comprises:
a coupon slide plate extending from said web cutting means; and,
an endless belt-type conveyor having one flight in close superimposed relationship over said coupon slide plate, said one flight cooperating with said coupon slide plate to move individual coupons from said cutting means, one at a time, in the interface of said one flight and said coupon slide plate.

7. The apparatus of claim 1, wherein said coupon alignment means comprises:
at least two spaced apart resilient cantilevered wire members extending toward said coupon conveyor means and cooperating with said conveyor means to temporarily interrupting movement of the coupon moving with said conveyor means.

8. The apparatus of claim 6, wherein:
said endless belt-type conveyor comprises a head pulley, a tail pulley, and at least two spaced apart belts trained about said head and tail pulleys for engaging opposite longitudinal sides of a coupon; and,
said coupon discharge means further comprises:
means defining at least two concave arcuate surfaces on said release plate, said arcuate surfaces being of substantially the same radius as said head pulley, each of said concave arcuate surfaces being disposed in overlaying relationship to that portion of a different one of said belts of said endless-type conveyor wrapped about said head pulley, and said arcuate defining means is mounted for movement toward and away from the head pulley of said conveyor; and,
said coupon engagement shoe is on said head pulley for rotation therewith, said shoe having a convex arcuate coupon contact surface of substantially the same radius as said concave surface defining means, said concave surface defining means being adapted to register with said convex surface once every revolution of said head pulley to push said concave surface defining means away from said head pulley and contact said coupon at said alignment means to move said coupon from said alignment means and deposit said coupon on the package moving immediately past said head pulley.

9. The apparatus of claim 8, wherein said coupon alignment means comprises a cantilevered resilient wire member extending closely adjacent a different one of each of said spaced apart belts.

10. The apparatus of claim 9, wherein said coupon engagement shoe is disposed between said spaced apart belts.

* * * * *